United States Patent [19]

Redele

[11] Patent Number: 4,823,757
[45] Date of Patent: Apr. 25, 1989

[54] METHOD OF SUPPLYING FUEL TO AN INTERNAL COMBUSTION ENGINE, AND AN ENGINE USING THE METHOD

[76] Inventor: Jean E. A. Redele, 11-13 rue Forest, 75018 Paris, France

[21] Appl. No.: 58,056

[22] Filed: Jun. 4, 1987

Related U.S. Application Data

[63] Continuation-in-part of Ser. No. 517,478, Jul. 26, 1983, abandoned.

[30] Foreign Application Priority Data

Jul. 27, 1982 [FR] France ............................. 82 13066

[51] Int. Cl.$^4$ ............................................ F02M 31/00
[52] U.S. Cl. .................................... 123/557; 123/501; 123/381
[58] Field of Search ............... 123/557, 543, 547, 552, 123/381, 500, 501, 357

[56] References Cited

U.S. PATENT DOCUMENTS

| | | | |
|---|---|---|---|
| 3,866,587 | 2/1975 | Knapp | 123/549 |
| 4,499,886 | 2/1985 | Hinds | 123/557 |
| 4,519,358 | 5/1985 | Redele | 123/557 |
| 4,600,825 | 7/1986 | Blazejovsky | 123/557 |
| 4,665,881 | 5/1987 | Wade | 123/447 |

FOREIGN PATENT DOCUMENTS

| | | | |
|---|---|---|---|
| 2653942 | 6/1978 | Fed. Rep. of Germany | 123/381 |
| 0133440 | 8/1983 | Japan | 123/381 |
| 0185839 | 10/1984 | Japan | 123/381 |

*Primary Examiner*—Willis R. Wolfe
*Assistant Examiner*—M. Macy
*Attorney, Agent, or Firm*—Sughrue, Mion, Zinn, Macpeak and Seas

[57] ABSTRACT

It has been found possible to achieve fuel savings by heating diesel fuel prior to injection to higher temperatures than those currently used, and in particular, for practical reasons, to temperatures in the range 70° C. to 120° C. However, to obtain the saving it is necessary to simultaneously modify the volumetric flow rate of fuel in order to maintain its mass flow rate in spite of two factors which tend to reduce the effective mass flow rate with increasing temperature, namely: volumetric expansion; and increased fluidity. Not only is fuel saved by heating to such temperatures, but the maximum power and torque which an engine is capable of delivering are also increased.

3 Claims, 5 Drawing Sheets

METHOD OF SUPPLYING FUEL TO AN INTERNAL COMBUSTION ENGINE, AND AN ENGINE USING THE METHOD

This is a continuation-in-part of Application Ser. No. 517,478 filed July 26, 1983, now abandoned.

The present invention relates to a method of supplying fuel to a fuel injection internal combustion engine, and more particularly to diesel engines. The invention also relates to engines applying the method.

BACKGROUND OF THE INVENTION

Proposals have already been made to heat diesel oil, particularly for cold starting diesel engines, for reducing emissions (white smoke on starting) by eliminating crystallization phenomena of paraffin products (needle crystals and nitrogen oxides) and, possibly, for saving fuel. The proper temperature is generally about 40° C. (105° F.). The various different methods are devices described on the subject indicate that means for heating the diesel oil are turned off once the oil admitted to the injection pump has reached a threshold temperature of about said desired value. Most heating systems either use an electrical resistance which is disconnected once the desired temperature is reached, or else they use radiator water whose temperature should never exceed about 80° C. Some works even indicate that exceessive heating leads to certain drawbacks which should be avoided (see U.S. Pat. No. 3,913,543). Although there are works which suggest that preheating diesel oil enables vehicle fuel consumption to be reduced on the road, tests have shown that this is to be detriment of other performance features, and that fuel consumption per horse power hour remains substantially unchanged.

SUMMARY OF THE INVENTION

In accordance with the present invention, it has been found possible to achieve worthwhile fuel savings by heating diesel fuel to higher temperatures than those currently used, and in particular, for practical reasons, to temperatures in the range 70° C. to 120° C. However, to achieve the saving it is necessary to simultaneously modify the volumetric flow rate of fuel in order to maintain its mass flow rate in spite of two factors which tend to reduce the effective mass flow rate with increasing temperature, namely: volumetric expansion; and increased fluidity.

This result may be achieved by heating the fuel upstream from the pump, in which case the pump needs to be modified to compensate. Proposals have already been made to heat the fuel between the pump and the injector. In this case the mass flow rate remains unchanged, but the preheat temperature cannot be controlled. It is well known that the volume of the duct between the injection pump and the injector should be as small as possible, in order to reduce the effects of delay and of damping the injection pressure front. For example, for a cylinder having a capacity of 50 cc, the injection tube has an average length of 50 cm and an inside diameter of 1.5 mm, giving a section of 1.8 mm$^2$ and a volume of 900 mm$^3$. When the engine is idling, the injection rate is 5 mm$^3$ per explosion, and under full load it is 30 mm$^3$ per explosion.

At full load (3,000 revolutions per minute (r.p.m.), or 50 revolutions per second), the fuel is delivered to the cylinder at 30 mm$^3 \times 25 = 750$ mm$^3$ per second. Since the volume of the tube is 900 mm$^3$, the fuel remains inside the tube for 1.2 seconds between the pump and the injector. It is very difficult to obtain an accurate heating temperature in this time span. To heat the fuel from 20° C. to 80° C., the tube wall would need to be about 200° C. It is not possible to obtain uniform temperature distribution, and there is a danger of causing hot spots at which the fuel vaporizes. However, in addition, if the engine speed varies, the fuel flow rate also varies, thereby varying the temperature to which it is heated, since it is not possible to change the heating temperature simultaneously with the flow rate. Suppose that after a period of acceleration the engine begins idling, then the fuel flow rate along the tube falls from 30 mm$^3$ per explosion to 5 mm$^3$, and the speed may simultaneously be divided by a factor of 3, causing the fuel flow rate to be reduced by an overall factor of 18. As a result the fuel would remain in the tube for a time span 18 times as long (18 × 1.2 sec = 21.6 sec), and it would immediately start boiling. That is why proposals for heating fuel between the pump and the injector have appeared to be quite impossible to implement.

When the fuel is heated upstream from the pump in accordance with the present invention, such pre-heating has two immediate primary consequences: the fuel expands and it also becomes more fluid. Consequently, a given volume of fuel injected into a cylinder provides a total amount of energy which decreases with increasing temperature. Further, there is increased leakage inside the pump. It is common practice for diesel oil leaks in fuel pumps to be generally encouraged, within limits, for pump lubrication. It will be appreciated that if the fuel becomes more fluid, then an unexpected amount of fuel is likely to leak into pump lubrication. Some authors have suggested heating fuel in order to increase its fluidity, on the grounds that increased fluidity is an advantage. This is wrong. Each engine is designed to operate with fuel having certain specified characteristics. If these characteristics are modified, the fuel no longer matches the engine, and its performance drops off (supposing it is still capable of operating). For example, a diesel engine designed to run on diesel fuel (gas oil) is incapable of running on gasoline: it is no longer lubricated and its bearings seize. Combustion speed is no longer the same, so the engine's speed of rotation needs to change, etc. That is why proposals to heat fuel in order to increase its fluidity are mere paper proposals, and tests performed thereon can only fail. Prior to application of the present invention, there has been no practical implementation of feeding heating fuel to a diesel engine.

These are the main reasons why diesel oil preheat temperatures have previously been kept fairly low, since otherwise efficiency fell of with rising preheat temperature. It was the observation during tests of the pressure on the pistons falling with rising diesel oil preheat temperature that lead the Applicant to the idea of modifying the volumetric flow rate of diesel oil injected into the engine in order to maintain the mass flow rate constant, and thereby re-establish piston pressure.

In general for an increase in temperature from 20° C. to 80° C., the volume flowrate needs to be increased by about 10%. About half of this increase corresponds to maintaining the mass flow rate of the fuel, and the other half corresponds to compensation for increased leakage due to the increased fluidity of the fuel. It should be observed that this leakage is recovered and returned to the fuel tank, so it does not represent an overall loss in the efficiency of the present invention.

Finally, it appears that the pre-heat temperature must be chosen and maintained with accuracy. In this case the appropriate degree of "accuracy" is within a range of plus or minus a few degrees centigrade, and not more than plus or minus 5° C. In addition to adapting the injection pump to the design operating temperature, the Applicant has also observed that engine ignition advance must be adjusted as a function of the fuel temperature in order to take account of variation in the combustion rate of the fuel as a function of temperature. Reference should be made back to the above remarks concerning heating fuel between the pump and injection per se. A non-uniform preheat temperature leads to degrimental effects and to poor combustion.

BRIEF DESCRIPTION OF THE DRAWINGS

The invention is described by way of example with reference to the accompanying drawings, which are all graphs as a function of engine revolutions per minute (rpm). In the drawings.

MORE DETAILED DESCRIPTION

Tests and measurements were performed on a six-cylinder RVI (Renault Vehicules Industriels) diesel engine of 11.4 liters cylinder capacity (ie. 6×1.9 liters) having a turbocompressor supercharger, fuel injection, and a maximum power of 300 horse power (the term "horse power" is used throughout this specification to designate metric horse power). Power was measured on a Schenck hydraulic brake of 600 HP capacity. The diesel oil was heated prior to reaching the injection pump. The pump comprises six cylinders in line, with a diameter of 12 mm on the standard pump and of 12.6 mm on the modified pump for heated disel oil, giving a 10% increase in area.

In a variant, it would have been possible to modify the stroke by modifying the cam.

In the graphs, curves I to V relate to standard operation, while curves I' to V' relate to operation in accordance with the invention.

The table below indicates the temperatures of the cooling water, the lubricating oil, and the fuel for injection, under standard conditions and under modified operation as a function of engine speed in revolutions per minute (rpm).

| engine rpm | STANDARD temperatures in °C. | | | MODIFIED temperatures in °C. | | |
|---|---|---|---|---|---|---|
| | water | oil | fuel | water | oil | fuel |
| 1,300 | 90 | 70 | 36 | 88 | 93 | 72 |
| 1,500 | 90 | 82 | 36 | 89 | 100 | 75 |
| 1,800 | 87 | 80 | 36 | 82 | 97 | 72 |
| 2,000 | 86 | 72 | 37 | 87 | 101 | 76 |
| 2,200 | 86 | 75 | 38 | 87 | 105 | 77 |

Figure 1:
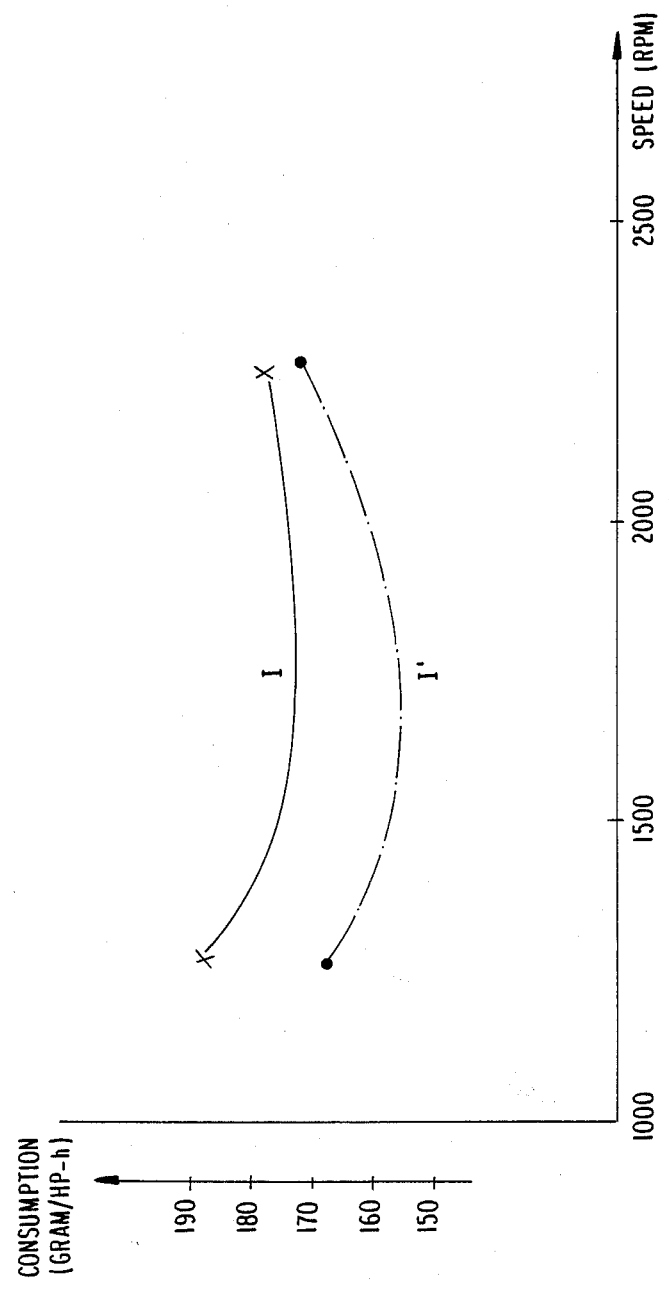
FIG. 1 is a graph of fuel consumption in grams per horse power hour.

FIG. 1 shows fuel consumption in grams per horse power hour. From the graph, it can be seen that the consumption is reduced by 5 to 10% over the entire range of speeds from 1250 rpm to 2250 rpm. These results were obtained while preheating the diesel fuel to a temperature in the range 72° C. to 77° C.

Figure 2:
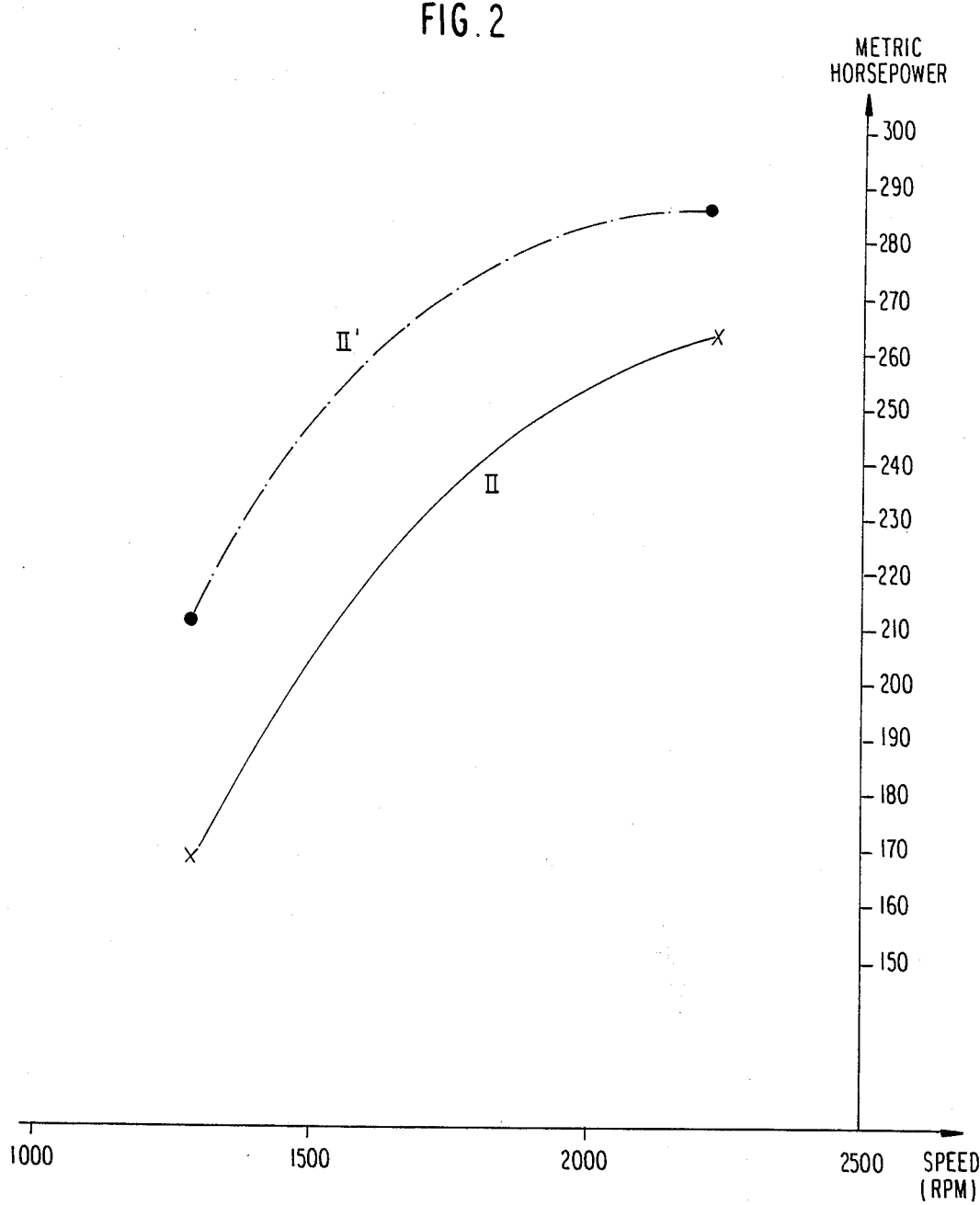
FIG. 2 is a graph of horse power.
Figure 3:
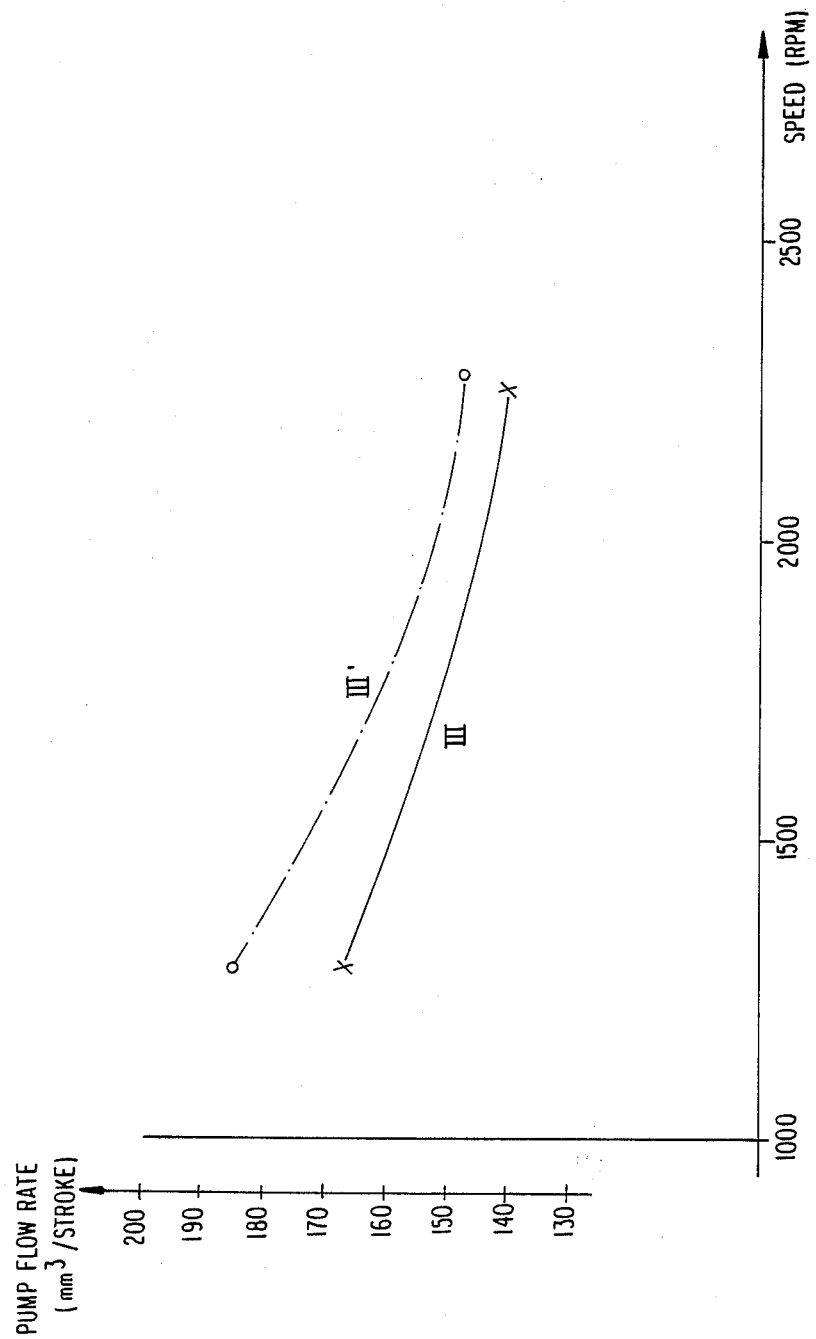
FIG. 3 is a graph of pump flow rate in mm$^3$ per stroke.
Figure 4:
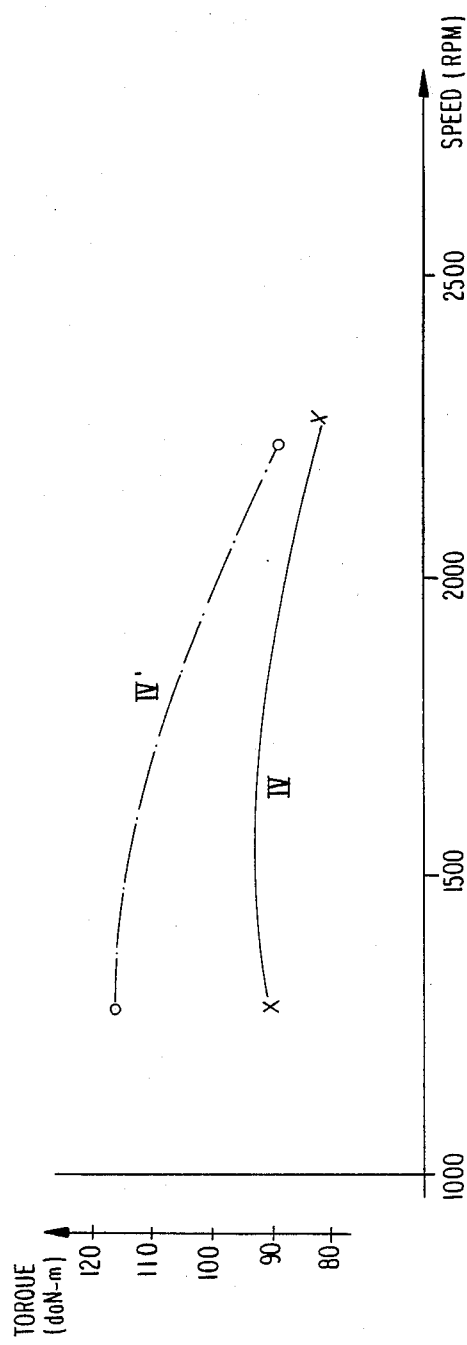
FIG. 4 is a graph of entire torque decanewton-meters.
Figure 5:
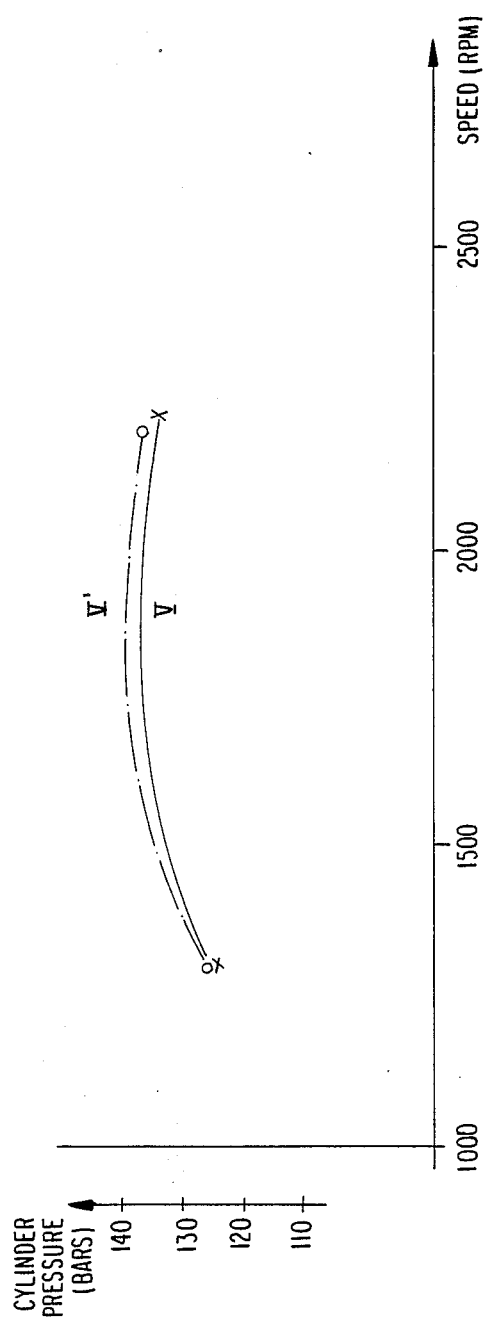
FIG. 5 is a graph of maximum cylinder pressure in bars.

FIG. 2 shows the power gain. FIG. 3 shows the increased injection pump flow rate in mm3 per stroke. FIG. 4 shows the increased torque in decanewton-meters. FIG. 5 shows the maximum pressure inside the cylinders.

In order to implement the method of the present invention, the injection pump flow rate in terms of mm$^3$ delivered per stroke must be increased. Not only is fuel consumption for given supplied power reduced, but other engine characteristics are also improved: the engine can deliver greater maximum power and it can deliver greater maximum torque. At 80° C., diesel fuel expands by about 4%. For other preheat temperatures, it is easy to measure the corresponding expansion and to measure the pump leakage rate experimentally. The pump is modified to increase the flow in such a manner as to ensure the correct mass flow rate.

It is fairly simple to modify the pump, since all that needs to be done is to replace one piston-and-liner pair with another such pair having a thinner liner and a piston of correspondingly greater diameter.

In numerous applications, an existing injection pump can merely be replaced by another injection pump designed for a higher flow rate, as a function of the design operating temperature. It should not be forgotten that once the operating temperature has been set, there will be a consequential change in ignition advance.

The invention also relates to internal combustion engines which apply the method in accordance with the invention, and in particular it applies to diesel engines including means for preheating their fuel, together with arrangements ensuring that the mass flow rate of the fuel is maintained. The invention is concerned with engines having a fuel heater disposed between the tank and the injection pump.

The invention further concerns engines having an injection pump whose capacity is adapted to the density and fluidity of the fuel.

The engine cooling liquid can be used to the fuel up to about 80° C. If a higher operating temperature is required, the lubricant could be used to heat the fuel since its temperature may be higher than 100° C. Naturally, the fuel could be heated simultaneously both by cooling liquid and by the lubricant.

Figure 6:
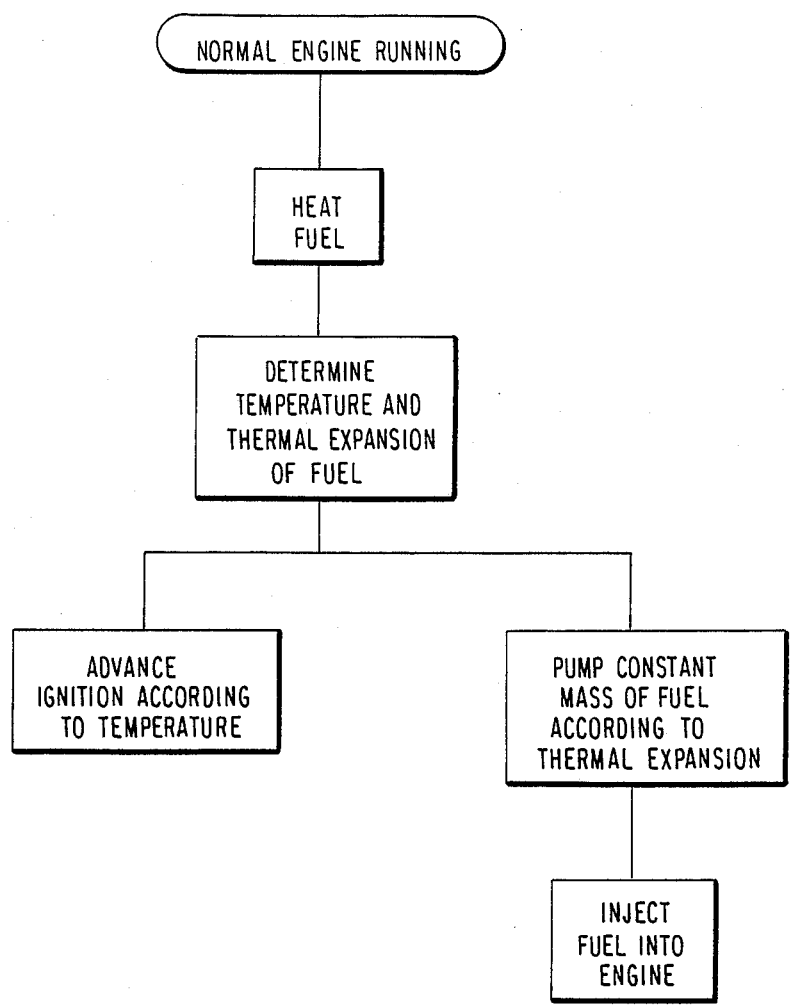
FIG. 6 is a flow diagram for the operation of the invention.

The process of the invention is shown in the flow diagram of FIG. 6.

I claim:

1. A method of supplying a fuel to a fuel injection internal combustion diesel engine, comprising the steps of:

heating the fuel to be injected to an elevated and substantially constant temperature;

pumping said heated fuel at a higher flow rate than is required for unheated fuel so as to maintain substantially constant a mass flow rate of said fuel during said pumping and thus compensate for the thermal expansion of said fuel resulting from the heating of said fuel to said substantially constant temperature during said heating step whereby said thermal expansion tends to reduce said mass flow rate;

injecting said heated and pumped fuel into a combustion chamber of said diesel engine, whereby said diesel engine is supplied with heated fuel at the maintained substantially constant mass flow rate with said mass flow rate being defined as the mass of fuel introduced into the cylinder of said diesel engine for each degree of rotation of the crank shaft of said diesel engine; and adjusting an ignition advance of said diesel engine in accordance with said elevated and substantially constant temperature wherein said heating, pumping and maintaining are operative during a normal running of said diesel engine.

2. A method according to claim 1, wherein the fuel is heated upstream from a fuel pump that is feeding an injector which is injecting fuel into said combustion chamber, and wherein said fuel pump is modified so as to pump said fuel at a higher volume flow rate than is required for unheated fuel such that the fuel pump delivers fuel to the injector at said maintained substantially constant mass flow rate taking the thermal expansion and fluidity of the heated fuel into account.

3. A method according to claim 1, wherein the fuel is heated by heat exchange with the diesel engine's lubricating oil.

* * * * *